United States Patent Office 2,891,092
Patented June 16, 1959

2,891,092

NEUTRAL DIESTERS OF 2,2'-[ISOPROPYLIDENE-BIS(2,6 - DICHLORO - p - PHENYLENEOXY)] - DI-ETHANOL

Everett C. Hurdis, Clifton, and John F. Petras, Glen Rock, N.J., assignors to United States Rubber Company, New York, N.Y., a corporation of New Jersey No Drawing. Application January 28, 1957
Serial No. 636,498

3 Claims. (Cl. 260—485)

The invention comprises new compositions of matter, namely, the neutral diesters of 2,2'-[isopropylidenebis-(2,6-dichloro-p-phenyleneoxy)]diethanol, represented by the formula

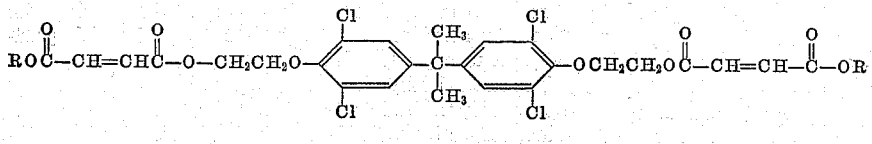

where R is either methyl or ethyl.

These new compounds are copolymerizable monomers and (like the unsaturated polyesters described in the Carleton Ellis U.S. Patent No. 2,195,362, dated March 26, 1940, and U.S. Patent No. 2,255,313, dated September 9, 1941) they can be copolymerized in combination with various reactive (copolymerizable) ethylenic monomers, such as vinyltoluene, vinyl acetate, 2-methyl-5-vinylpyridine, methyl methacrylate, diallyl phthalate, triallyl cyanurate, N-vinylphthalimide, diallyl benzenephosphonate, etc., to give new and useful plastics. However, in contradistinction to the conventional unsaturated polyesters covered by the above mentioned Ellis patents, the new monomer of this invention has a number of important advantages. Specifically, when copolymerized with styrene in mixtures containing 30–70% styrene, the following properties result (in comparison with conventional unsaturated polyesterstyrene mixtures):

(1) Higher heat distortion temperature.
(2) Greater chemical resistance.
(3) Greater resistance to discoloration on exposure to light.

These advantages of the new copolymerizable monomer of this invention are the result of several important differences in its chemical make-up as compared with conventional copolymerizable unsaturated polyesters:

(1) The new monomer of this invention is prepared from substantially two mols of dialkyl ester of dicarboxylic acid per mol of the dihydroxy compound, resulting in a definite chemical compound of relatively low molecular weight. The conventional unsaturated copolymerizable polyesters, i.e., those covered by the above mentioned Ellis patents, in contrast are prepared by reacting substantially only one mol of unsaturated dicarboxylic acid with one mol of the dihydroxy compound, so that there results a mixture of chemical species with a broad molecular weight distribution and relatively high average molecular weight.

As indicated in our prior copending application Serial No. 622,548, filed November 16, 1956, 2,2'-[isopropylidenebis(2,6-dichloro-p-phenyleneoxy)] diethanol is preparable from 4,4'-isopropylidenebis(2,6-dichlorophenol) by reaction with either ethylene oxide or chlorohydrin, as illustrated by the following Example A (1) and (2):

EXAMPLE A

This example demonstrates (1) preparation of 4,4'-isopropylidenebis(2,6-dichlorophenol), and (2) preparation of 2,2' - [isopropylidenebis(2,6-dichloro-p-phenyleneoxy] diethanol therefrom.

(1) A reaction flask of 12 liters capacity, equipped with mechanical stirrer, dropping funnel and reflux condenser was charged with the following:

4,4'-isopropylidenediphenol ("Bisphenol A") M.P.
  160° C.–162° C., 3 mols _____g__ 684
Acetic acid, glacial _____ml__ 3420

The mixture was heated to 40° C., and then 1701 g. sulfuryl chloride (12.8 mols) was added slowly through a dropping funnel, adjusting the rate of addition to keep the pot temperature below 60° C. The sulfur dioxide and hydrogen chloride evolved were disposed of by a simple scrubber. After all sulfuryl chloride was added, the mixture was heated to 114° C. to assure complete reaction. To obtain the product in crystalline form, the mixture was cooled to 60° C. and 6 liters of cold water run in with stirring. The crude crystalline 4,4'-isopropylidenebis(2,6-dichlorophenol) thus obtained was filtered off and dried to give a yield of 975 g. (88.8%). Recrystallization of crude product from benzene, using 2.5 ml. benezene, per gram of material, gave 750 g. (68.3% yield) of pure 4,4'-isopropylidenebis(2,6-dichlorophenol) melting at 136–137° C.

*Analysis*

|  | Calculated | Observed |
|---|---|---|
| Hydroxyl number | 306 | 302 |
| Chlorine, percent | 38.8 | 38.3 |

(2) The tetrachlorinated bisphenol (4,4'-isopropylidenebis(2,6-dichlorophenol)) prepared as above was then reacted with ethylene oxide as follows:

A reaction flask of 2 liter capacity, equipped with mechanical stirrer, gas inlet tube and reflux condenser was charged with:

Isopropylidenebis(2,6-dichlorophenol), 2 mols __g__ 732
Propylene glycol, used as solvent _____ml__ 150
Benzyltrimethylammonium chloride, 60% aqueous
  solution _____ml__ 32
50% sodium hydroxide solution _____g__ 16

The charge was melted and kept at 105–115° C., while ethylene oxide was bubbled in. When the mixture had gained 170 grams in weight (theory 175 g.) the reaction was discontinued. The reaction mixture was then dissolved in 8 liters of hot methanol, and 4 liters of water were added to precipitate the product in crystalline form. By filtering and drying, 1398 g. of material melting at 112° C.–114° C. was obtained. By adding an additional 2 liters of water to the mother liquor a second fraction weighing 191 g. of M.P. 109° C.–112° C. was isolated. Total yield was 87.5%. The following analysis confirmed that the product was 2,2'-[isopropylidenebis(2,6-dichloro-p-phenyleneoxy)] diethanol.

Analysis

|  | Calculated | Observed |
|---|---|---|
| Molecular weight | 454 | 452 |
| Hydroxyl number | 247 | 247 |
| Chlorine, percent | 31.3 | 30.9 |

(2) The new monomers of this invention are so prepared that the unsaturation in the compounds occurs in definite, known positions at the ends of the molecular chains, rather than dispersed at random throughout the molecules as in the case of conventional copolymerizable unsaturated polyesters. Localization of the unsaturation at the chain ends in this way usually results in superior physical properties in copolymers, because of the high degree of structural regularity obtained.

(3) Conventional unsaturated polyesters have units held together by ester linkages entirely. The new copolymerizable monomers of this invention contain a considerable proportion of chemically stable phenyl ether linkages with resulting advantages in resistance to chemicals, heat and light.

The following examples are given to illustrate the invention, parts being by weight.

EXAMPLE 1

This example demonstrates the ester interchange reaction between 2,2' - [isopropylidenebis(2,6 - dichloro-p-phenyleneoxy)]diethanol and dimethyl fumarate to produce the neutral methyl fumarate diester.

A reactor was charged with:

| | |
|---|---|
| 2,2' - [isopropylidenebis(2,6 - dichloro-p-phenyleneoxy)]diethanol 0.5 mol _____g__ | 227 |
| Dimethyl fumarate, 1.5 mols _____g__ | 216 |
| Toluene _____ml__ | 200 |
| p-Tert-butylcatechol _____g__ | 0.8 |

The mixture was first refluxed using a Dean and Stark moisture trap until all water was removed azeotropically. Magnesium metal catalyst (4.4 g.) was then added and the mixture slowly distilled, taking off the methyl alcohol-toluene azeotrope, vapor temperature 65° C.–69° C. When pot temperature had risen to 160° C. the reaction was complete. Residual solvent and excess unreacted dimethyl fumarate were then distilled out under high vacuum. On cooling the product formed a clear, glassy solid. Completeness of the reaction was proved by the following analysis:

|  | Calculated | Observed |
|---|---|---|
| Molecular weight | 678 | 840 |
| Saponification equivalent | 170 | 186 |
| Chlorine, percent | 20.3 | 21.8 |

The monomer prepared in this way was copolymerized with styrene in a composition containing 50% by weight of styrene and 4% of benzoyl peroxide paste (1:1 benzoyl peroxide and tricresyl phosphate). The product was a hard, transparent plastic. As indicated in Table I, this product showed the exceptionally high heat distortion temperature of 133° C. (compared with about 80° C. for commercial general purpose unsaturated polyester styrene mixtures). The other properties measured were comparable to or better than a conventional general purpose unsaturated polyester styrene composition.

EXAMPLE 2

This example demonstrates the preparation of a copolymerizable monomer from 2,2'-[isopropylidenebis-(2,6-dichloro-p-phenyleneoxy)]diethanol and diethyl fumarate by ester interchange.

A reactor was charged with the following:

| | |
|---|---|
| 2,2' - [isopropylidenebis(2,6 - dichloro-p-phenyleneoxy)]diethanol, M.P. 114–117° C., 0.625 mol _____g__ | 284 |
| Diethyl fumarate, 2.24 mols (80% excess) ____g__ | 322 |
| Benzene _____ml__ | 250 |

The small amount of water in the system was removed azeotropically by refluxing at 100° C.–110° C. pot temperature. The mixture was then cooled to 95° C. and 4 ml. of tetrabutyl titanate was added. The mixture was then slowly distilled, adjusting the rate of takeoff so that vapor temperature stayed in the range 70° C.–75° C. When evolution of ethyl alcohol slowed, the pot temperature was raised to a maximum of 150° C. to insure completeness of reaction. The mixture was then diluted with an equal volume of benzene plus 3 ml. of water and the titanate ester catalyst destroyed by heating 2 hours at 75° C. with stirring. After filtration from precipitated titanium dioxide, the benzene and unreacted diethyl fumarate were removed by vacuum distillation. On cooling, the product formed an extremely viscous liquid which gradually set to a glassy solid.

The neutral ethyl fumarate diester obtained in this way was copolymerized with styrene in two combinations using, respectively, 40% and 50% styrene. Products obtained were clear, hard plastics with useful properties. The physical testing data listed in Table I indicate exceptionally high heat distortion temperature, as compared with commercial general purpose unsaturated polyester styrene mixtures. The other physical properties obtained were comparable to or better than commercial general purpose unsaturated polyester styrene mixtures.

TABLE I

*Properties of copolymers of styrene with neutral diesters of 2,2' - [isopropylidenebis(2,6 - dichloro-p-phenyleneoxy)]diethanol and monoalkyl fumarate*

| Material of Example | 1 | 2 | 2 |
|---|---|---|---|
| Alkyl ester group | methyl | ethyl | ethyl |
| Composition: | | | |
| Monomer, pts. by weight | 50 | 50 | 60 |
| Styrene, pts. by weight | 50 | 50 | 40 |
| 50% Benzoyl peroxide paste | 4 | 4 | 4 |

Cured 15 hrs. at 55° C. +1 hr. at 70° C. +1 hr. at 90° C. +1 hr. at 110° C

|  | 1 | 2 | 2 |
|---|---|---|---|
| Physical Properties: | | | |
| Rockwell R hardness | 126 | 127 | 127 |
| Tensile strength, p.s.i | 4,900 | 5,100 | 5,300 |
| A.S.T.M. Elongation at break, percent | 1.5 | 1.0 | 1.5 |
| Young's Modulus, p.s.i. × 10⁻³ at— | | | |
| 25° C | 510 | 480 | 490 |
| 50° C | 450 | 440 | 430 |
| 75° C | 410 | 410 | -------- |
| 100° C | 330 | 290 | 270 |
| 125° C | 170 | 87 | 120 |
| 150° C | 5.0 | 3.7 | 4.5 |
| Izod notched impact strength, ft. lb. per inch of notch | 0.22 | 0.24 | 0.21 |
| Heat distortion temperature, °C | 133 | 124 | 126 |

NOTE.—Elongations were calculated from jaw separation and are therefore higher than true absolute values. A jaw separation elongation of 8% corresponds to elongation of 1.3–1.5% by A.S.T.M.

Having thus described our invention, what we claim and desire to protect by Letters Patent is:

1. A fumaroid type compound represented by the general formula

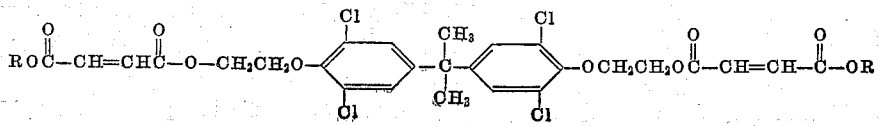

where R is a member selected from the class consisting of methyl, and ethyl.

2. A fumaroid type compound represented by the general formula

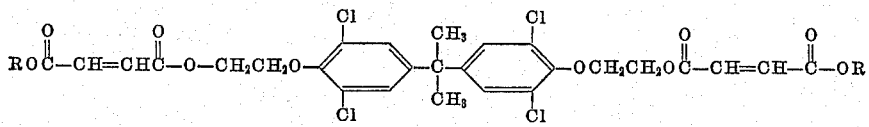

where R in each instance represents —CH₃.

3. A fumaroid compound represented by the general formula

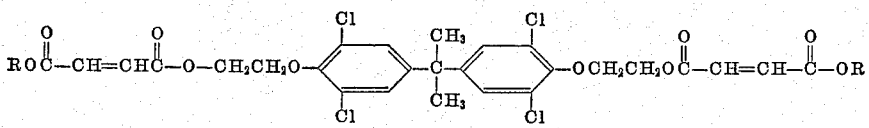

where R in each instance represents —C₂H₅.

References Cited in the file of this patent
UNITED STATES PATENTS

| | | |
|---|---|---|
| 2,359,622 | Coleman et al. | Oct. 3, 1944 |
| 2,634,251 | Kass | Apr. 7, 1953 |
| 2,652,419 | DeGroote | Sept. 15, 1953 |